Sept. 29, 1959 W. KRETSCHMER 2,906,091
PROPELLANT SYSTEMS FOR REACTION MOTORS
Filed Nov. 27, 1957 2 Sheets-Sheet 2
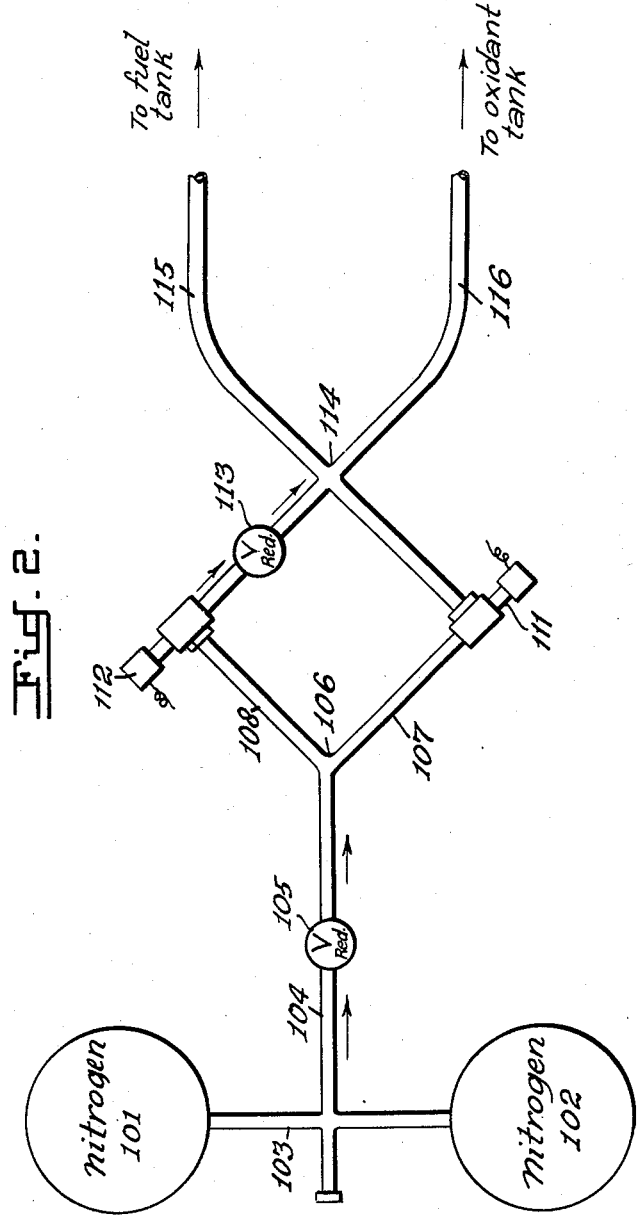
INVENTOR.
Willi Kretschmer
BY

United States Patent Office 2,906,091
Patented Sept. 29, 1959

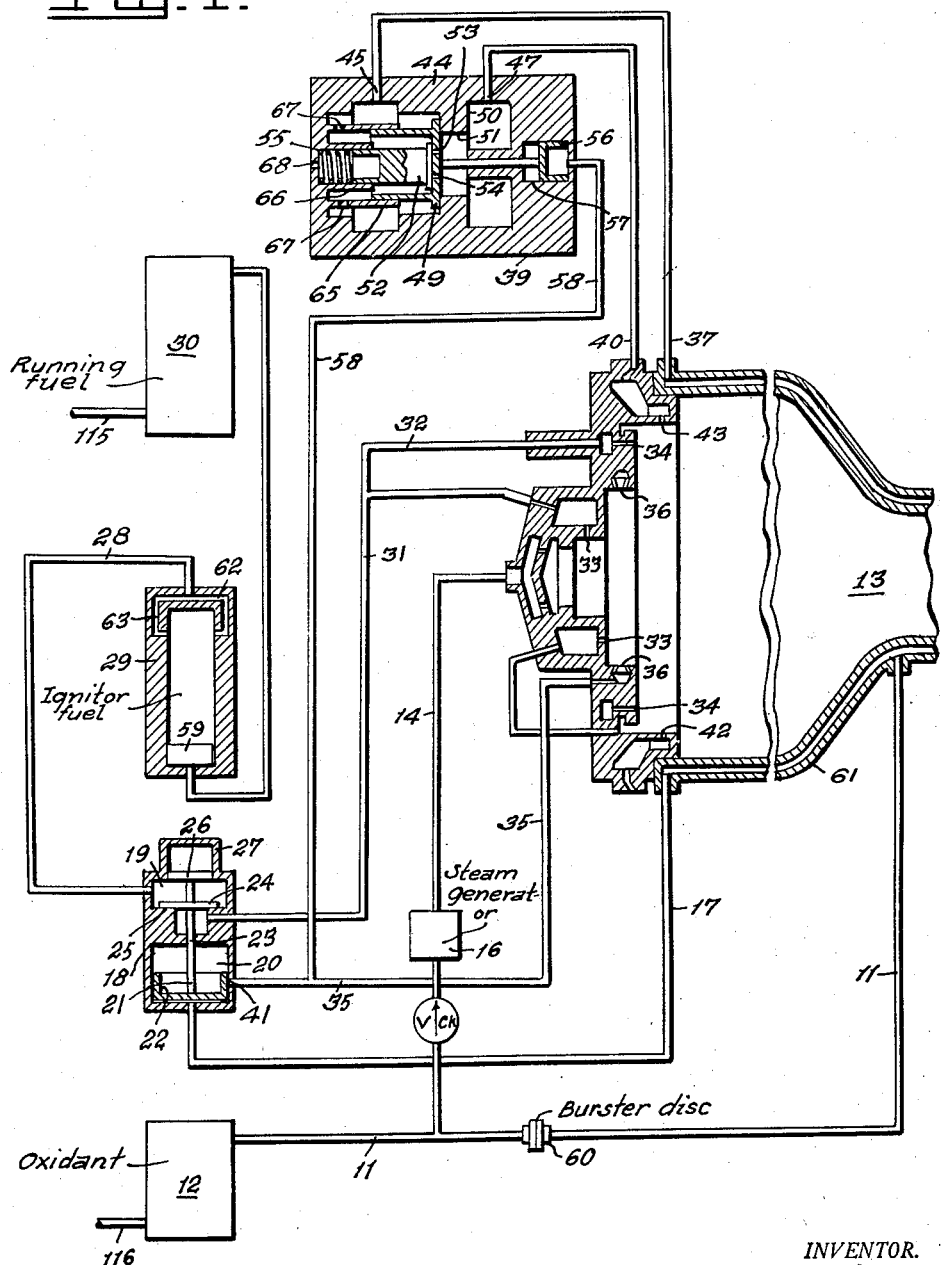

2,906,091

PROPELLANT SYSTEMS FOR REACTION MOTORS

Willi Kretschmer, Nobel, Ontario, Canada, assignor to Minister of Supply, in Her Majesty's Government of the United Kingdom of Great Britain and Northern Ireland, London, England Application November 27, 1957, Serial No. 699,420

13 Claims. (Cl. 60—35.6)

This invention relates to propellant systems for jet reaction type motors of the kind in which at least two prepellants are supplied to the motor combustion chamber for full thrust running. This application is a continuation-in-part of co-pending application Serial No. 398,244 filed December 15, 1953, now abandoned.

In one arrangement according to the invention oxidant is fed under pressure to a primary valve means which is actuated by said oxidant to open firstly a connection to the combustion chamber for fuel under pressure and secondly a connection for the oxidant to flow to the combustion chamber and, after ignition when the combustion chamber pressure reaches a given value, a second stage valve means is actuated by said combustion chamber pressure to open a further connection for oxidant under pressure to the combustion chamber. Further valve means may be provided which open under the increasing combustion chamber pressure when the latter reaches a predetermined increased value to allow a further increased flow of oxidant to the combustion chamber for full thrust running.

There may be included in the line from a supply of running fuel which is relatively difficult to ignite to the first valve means a container for igniter fuel which with the running oxidant can be ignited by superheated steam, means being provided for introducing superheated steam into the combustion chamber and the arrangement being such that the running fuel does not pass to the combustion chamber until it has replaced the igniter fuel in said container and all the latter has been fed to the combustion chamber.

Preferably, the actuation of the primary valve means under the influence of the oxidant under pressure is progressive, and it is desirable that it should be subject to damping by a dash pot arrangement, so that the oxidant and the fuel flow therethrough to the combustion chamber at progressively increasing rates, the rate of flow of igniter fuel when used reaching a maximum and the actuation of the second stage valve means to open the further oxidant connection taking place before said igniter fuel is all consumed. Further, the full thrust flow of oxidant to the combustion chamber, will not be permitted until a predetermined pressure is reached in the combustion chamber.

In one apparatus according to the invention, oxidant under pressure is fed to a catalytic steam generator from which superheated steam issues into the combustion chamber which is thereby heated to facilitate combustion. About 15 seconds after the commencement of supply of oxidant under pressure to the catalytic steam generator oxidant under pressure is also fed to the first valve means and actuates the first valve means to progressively open a fuel connection to the combustion chamber, and, about 0.1 to 0.2 second after the igniter fuel has reached the combustion chamber to progressively open an oxidant connection to the combustion chamber. The mixture of igniter fuel and oxidant in the combustion chamber ignites spontaneously in the heated combustion chamber and when the consequently rising combustion chamber pressure has reached about 50 lb. per square inch it actuates the second stage valve means and an oxidant connection therein to the combustion chamber is thereby opened. When the consequently still rising combustion chamber pressure reached 150 lb. per square inch, which is approximately 0.5 second after ignition, it again actuates the second stage valve means and a further oxidant connection therein to the combustion chamber is also opened and a flow of oxidant suitable for full thrust running passes to the combustion chamber. The running fuel follows the igniter fuel when the latter has been consumed.

The system of pressurizing the fuel and oxidant tanks is arranged to provide a relatively low pressure during the heating of the combustion chamber by the steam generator, and a relatively higher pressure for initiating and running the motor.

A propellant system according to one form of the invention is illustrated in the diagrammatic drawing of Fig. 1.

Fig. 2 is a diagrammatic drawing of the pressurizing system of this invention.

As shown a pipe line 11 for oxidant leads from an oxidant container 12 to a cooling jacket 61 of a combustion chamber 13, a branch pipe 14 controlled by a non-return valve 15 leading to a catalytic steam generator 16 and thence to the center of said chamber 13 at its inner end. A pipe 17 for oxidant leads from the cooling jacket to a first valve means indicated generally at 18, having upper and lower compartments 19 and 20, respectively. This valve 18 has two components, the first of which is identified as compartment 20 and portion 22 slidable therein, and the second of which is identified as compartment 19 and members 24 and 26, both components being simultaneously actuated through the intermediary of stem 21. An obturating member having a stem portion 21 extending upwardly from a piston-like portion 22 is slidable axially within the casing of the valve means 18, the stem 21 extending fluid tight through the dividing wall 23 between the two compartments 19 and 20. A valve disc member 24 is carried on the upper part of the stem 21 and when the obturating member is in its lowermost position the disc 24 seats downwardly against an annular abutment 25 within the valve means 18. A further small piston-like member 26 is located on the upper end of the stem 21 within a reduced cylinder portion 27 of the valve means 18 to damp the movement of the obturating member 21, 22, 24, 26.

The upper compartment 19 is connected, on the one hand via a fuel pipe 28 and container 29 for igniter fuel to a main running fuel container 30 and, on the other hand, via a fuel pipe 31 having a branch 32 to the first and second stage fuel nozzles two of each of which are shown at 33, 33 and 34, 34 respectively, of the combustion chamber 13. The lower compartment 20 is connected via an oxidant pipe 35 to the first stage oxidant nozzles two of which are shown at 36, 36, of the combustion chamber 13. The cooling jacket 61 of the combustion chamber 13 is connected via an oxidant pipe 37, a second valve means 39 and a further oxidant pipe 40 to the second stage oxidant nozzles of the combustion chamber 13 two of which are shown at 42 and 43 respectively. The second valve means 39 has a casing 44 with inlet and outlet passages 45 and 47 respectively. A main obturating member 49 is adapted to seat against an inner dividing wall 50 and so seal a passage 51 therethrough and a subsidiary obturating member 52 is adapted to seat against the main obturating member 49 and to seal passages 53, 54 through said main obturating member, both said obturating members being influenced to said closed positions by a spring 55 and the pressure of oxidant acting through the oxidant pipe 37. The valve 39 has a first open-end sleeve 65 within which obturating member 49 has a smooth sliding pressure-tight fit, and a second shorter sleeve 66 coaxially within sleeve 65 and within which obturating member 52 has a smooth sliding pressure-tight fit. Sleeve 65 has a series of orifices 67 in its base through which pressure from oxidant pipe 37 may pass to the interior of the variable volume chamber formed by sleeve 65 and member 49. Also to be noted is an orifice 68 through the bottom of the chamber defined by second sleeve 66, to the outside air. A piston 56 in a cylinder 57 formed in the casing 44 is operative under the influence of oxidant from a branch pipe 58 from the oxidant pipe 35 to assist in moving the main obturating member 49 to an open position as will later be described. The igniter fuel container 29 comprises a hollow cylinder which houses a piston 59 and is initially filled with igniter fuel.

The pressurizing system includes a pair of spheres 101 and 102 containing nitrogen at a pressure of 4000 lbs./in.$^2$ connected by a conduit 103. Conduit 103 is connected at its center to a conduit 104 which includes a pressure reducing valve 105. Conduit 104 branches at 106 into a main conduit 107 and a by-pass conduit 108. Main conduit 107 contains explosive valve 111 and by-pass conduit 108 contains explosive valve 112 and a pressure reducing valve 113. Conduits 107 and 108 rejoin at point 114. At common point 114 a conduit 115 is provided for pressurizing the fuel tank 30 and conduit 116 is provided for pressurizing the oxident tank 12.

In operation, the fuel (kerosene) and oxidant (hydrogen peroxide) containers 30 and 12 respectively are pressurized and oxidant passes through the branch pipe 14 and non-return valve 15 to the catalytic steam generator 16 from which superheated steam and oxygen pass to the interior of the combustion chamber.

The pressurizing system operates as follows: Explosive valves 111 and 112 are normally closed. When it is desired to start the motor, explosive valve 112 is opened, permitting pressure to be exerted through conduits 103, 104, 108, 115 and 116. Valve 105 reduces the pressure in the line from 4000 lb./in.$^2$ to 600 lb./in.$^2$ and valve 113 reduces the pressure from 600 lb./in.$^2$ to 200 lb./in.$^2$. Thus the pressure exerted upon the fuel and oxidant containers through conduits 115 and 116 is 200 lb./in.$^2$. In the fuel line this pressure is effective to hold valve member 25 in valve 18 in a closed position. In the oxidant line the pressure is effective to cause a flow of oxidant to the steam generator, but insufficient to cause a flow in line 11 past burster disc 60. When the steam has raised the temperature in the combustion chamber to the desired level (which takes about 15 seconds) explosive valve 111 is opened. Actuation of this valve may be accomplished by hand or automatically, as by a time delay mechanism or a mechanism responsive to combustion chamber temperature. With explosive valve 111 open, main conduit 107 permits a pressure of 600 lbs./in.$^2$ to be brought to bear on the fuel and oxidant containers. This pressure is communicated to the burster disc 60.

When the pressure of oxidant rises above 400 lb. per square inch the burster disc 60 in the hydrogen peroxide pipe 11 fractures thereunder and hydrogen peroxide flows via the cooling jacket 61 of the combustion chamber 13, and the pipe 17 to the lower compartment 20 of the first valve means 18 below the piston 22. The pressure of the hydrogen peroxide raises the piston 22 and with it the remainder of the obturating member i.e. the stem 21, disc member 24, and small piston like member 26. The small piston member 26 acts as a damper and ensures steady movement of the obturating member as a whole. Immediately the disc 24 rises from the annular abutment 25, pressure from the kerosene in the main fuel container 30 is operative to raise the piston 59 in the igniter container 29 thereby ejecting the igniter fuel which flows through the pipe 28 and upper compartment 19 into the pipes 31 and 32 and thence to the combustion chamber 13 through the injector nozzles 33, 34. After the disc 24 is raised and igniter fuel has commenced to flow to the combustion chamber 13, the continuous movement of the piston member 22 upwards progressively uncovers ports one of which is shown at 41 leading to the oxidant pipe 35 through which hydrogen peroxide then flows to the combustion chamber 13. It also acts via the pipe 58 on the piston 56 of the second stage valve means 39. The arrangement is such that these ports commence to open from 0.1 to 0.2 second after the disc 24 has moved away from the abutment 25. After the spontaneous ignition, which then takes place and when the rising pressure in the combustion chamber reaches a predetermined value, in this case 50 lb./sq. inch, it acts through the pipe 40. The pressure of the oxidant is at this time effective through pipe 37 and passage 45, within the chamber in valve 39 external of member 49 and also, by the way of orifices 67, within the member. This pressure acts to seat member 49 firmly and, since subsidiary obturating member 52 is pressed against member 49, by action of spring 55, the pressure is at this time without effect upon member 52. The rising pressure in the combustion chamber is applied by way of pipe 40 to the chamber in valve 39 to the right of member 49, as the parts are viewed in the figure. This pressure acts through ports 53 and 54, to move member 52 out of contact with member 49 whereupon the entire pressure over pipe 37 acts to open the subsidiary obturating member 52 whereby hydrogen peroxide under pressure from the main oxidant container 12 is allowed to flow at a restricted rate through the oxidant pipe 37, through the valve means 39, via the now open ports 53, 54, and pipe 40 to the second stage oxidant nozzles 42, 43 of the combustion chamber 13. After all the igniter fuel from the container 29 has been consumed, and the piston 59 is in its uppermost position kerosene flows through passages 62, 63 to the pipe 28 and thence to the combustion chamber where it is ignited by the already burning mixture, and combustion continues. The subsequent complete opening of the second valve means 39 results from the further increasing combustion chamber pressure transmitted thereto via the liquid hydrogen peroxide in the pipe 40 and also the oxidant pressure downstream of the first stage oxidant valve 18 acting via the pipe 58 on the piston 56 and the arrangement is such that the second valve means 39 is fully opened (i.e. the main obturating member 49 is raised from the wall 50) to initiate full thrust running when the combustion chamber pressure reached 150 lb. per sq. inch.

It will be seen that the entire starting operation is automatic and takes place within about 0.5 second.

I claim:

1. In a propellant system for a jet reaction motor, means forming a combustion chamber having inlets for fuel and oxidant, a source of fuel under pressure, a first conduit connecting said source and fuel inlet, a source of oxidant under pressure, said first conduit including a normally closed valve having first and second components connected for simultaneous actuation, a pressure connection from said source of oxidant under pressure to the first component of said valve, means responsive to the application of oxidant pressure to the first component of said valve to open the second component to initiate flow of fuel through said first conduit, an oxidant conduit from the first component of said valve to said combustion chamber, the first component of said valve opening said oxidant conduit to flow of oxidant only after flow of fuel has begun through said second component.

2. A system as recited in claim 1, said valve member including a slidable valve stem, a closure member fixed on said stem and normally in position preventing flow of fuel through said valve, a piston fixed on said stem, pressure on said piston from said oxidant connection being effective to move the same and move said closure member to open position, said oxidant connection with said valve being uncovered by said piston only after a predetermined movement of the same in valve-opening motion.

3. In a propellant system for a jet reaction motor, means forming a combustion chamber having an inlet for fuel and an inlet for oxidant, a source of fuel under pressure, a first pipe connecting said source of fuel and fuel inlet and including a normally closed valve, a source of oxidant under pressure, a conduit connecting said source of oxidant with said valve, a second pipe connecting said valve with said inlet for oxidant, said valve being opened for flow of fuel by and in response to application of oxidant pressure thereto, and means incorporated in said valve connecting said conduit and second pipe for flow of oxidant only after said valve has been opened for flow of fuel.

4. In a propellant system for a jet reaction motor having a combustion chamber and discrete fuel and oxidant inlets to said chamber, a source of fuel under pressure, a source of oxidant under pressure, first and second conduits connecting said fuel source and fuel inlet and said oxidant source and oxidant inlet, respectively, said conduits including normally closed valve means having a common stem responsive to application of oxidant pressure to said valve means to open said first and second conduits in sequence in the order mentioned.

5. A propellant system as recited in claim 4, said combustion chamber having a steam inlet, a steam conduit connecting said oxidant source and steam inlet, and a check valve and steam generator in said steam conduit in sequence in the downstream direction.

6. A propellant system as recited in claim 4, a second stage normally closed oxidant valve having an inlet and outlet, a fluid connection between said oxidant source and said valve inlet, a pipe connecting the outlet of said second stage valve with a second oxidant inlet of said combustion chamber, said second stage valve being progressively opened by and in response to increase in combustion pressure in said chamber to increase the flow rate of oxidant in proportion with said pressure increase.

7. In a propellant system for a jet reaction motor having a fuel inlet and first and second oxidant inlets, a source of fuel under pressure, a source of oxidant under pressure, a first conduit interconnecting said fuel source and fuel inlet, a second conduit connecting said oxidant source and first oxidant inlet, said first and second conduits including normally closed valve means opening said first and second conduits in sequence in response to application of oxidant pressure from said oxidant source, a second stage normally closed oxidant valve having an inlet and an outlet, a third conduit connecting said oxidant source and said valve inlet, a fourth conduit connecting the outlet of said second stage valve and second oxidant inlet, said second stage valve opening by and in response to pressure of combustion gases in said motor to increase flow of oxidant to said motor in proportion to increase of pressure therein.

8. A propellant system as recited in claim 7, and a pressure connection between said second stage valve and said second conduit downstream of said valve means said second stage valve including means responsive to oxidant pressure in said connection to assist in opening the same.

9. In a propellant system for a jet reaction motor having a combustion chamber with a fuel inlet and an oxidant inlet, a source of fuel under pressure, a source of oxidant under pressure, a first conduit connecting said source of fuel with said fuel inlet, a second conduit connecting said source of oxidant with said oxidant inlet, said first and second conduits including normally closed primary valve means having a common stem, said primary valve means including a cylindrical compartment having a piston slidably fitting therein, an oxidant inlet connection to the end of said compartment and an oxidant outlet in the side wall of said compartment uncovered by said piston only after a predetermined distance of travel of said piston under oxidant pressure, said stem responsive to initial movement of said piston to open said first conduit to flow of fuel therethrough.

10. A propellant system as recited in claim 9, a second stage oxidant valve, a third conduit connecting said oxidant source upstream of said primary valve means with said second stage valve, a fourth conduit connecting said combustion chamber and said second stage valve, said second stage valve including means opening the same to restricted flow of oxidant through said third conduit, by and in response to a first pressure increase in said chamber acting through said fourth conduit.

11. A propellant system as recited in claim 10, a fifth conduit connecting said second stage valve with said second conduit downstream of said primary valve means, said second stage valve including means responsive to pressure in said fifth conduit to assist in opening said second stage valve to unrestricted oxidant flow to the combustion chamber through said third and fourth conduits.

12. In a propellant system for a jet reaction motor including a combustion chamber with a fuel inlet and an oxidant inlet, a source of regular fuel under pressure, a source of oxidant under pressure, fuel and oxidant conduits connecting each said source with a corresponding inlet, said conduits including valving means, said valving means including stem means responsive to oxidant pressure opening said fuel conduit to flow of fuel and thereafter opening said oxidant conduit to flow of oxidant, a container in said fuel conduit upstream of said valving means to contain a supply of igniter fuel, a piston fitting said container for sliding from the inlet to the outlet end thereof, said piston when fully moved to the outlet end of said tank uncovering openings for the direct flow of regular fuel to said combustion chamber.

13. In a propellant system for a jet reaction motor, a pressure reservoir, fuel and oxidant containers, normally closed low and high pressure lines connecting said pressure reservoir to said fuel and oxidant containers, a combustion chamber, a normally closed fuel conduit connecting said fuel container to said combustion chamber, a first normally closed oxidant conduit having a burster disc therein connecting said oxidant container to said combustion chamber, a second oxidant conduit having a steam generator therein connecting said oxidant container to said combustion chamber, said low pressure line opened first to actuate said steam generator and thus heat said combustion chamber, said high pressure line opened thereafter to overcome said burster disc and initiate flow in said first oxidant conduit, means in said oxidant conduit responsive to flow of oxidant therein to open said fuel conduit.

No references cited.